United States Patent

Jones et al.

[15] 3,659,590
[45] May 2, 1972

[54] RESPIRATION TESTING SYSTEM

[72] Inventors: William C. Jones, Elmhurst, Ill.; Joseph Mailen Kootsey, Durham, N.C.

[73] Assignee: Jones Medical Instrument Company, Oakbrook, Del.

[22] Filed: Oct. 13, 1969

[21] Appl. No.: 865,754

[52] U.S. Cl. ...................................128/2.08, 73/23, 73/421.5
[51] Int. Cl. .........................................................A61b 5/08
[58] Field of Search ..................128/2.07, 2.08; 73/23, 421.5

[56] References Cited

UNITED STATES PATENTS

| | | | |
|---|---|---|---|
| 2,707,947 | 5/1955 | Traugott | 128/2.07 |
| 2,709,430 | 5/1955 | Traugott | 128/2.07 |
| 2,792,828 | 5/1957 | Engelder | 128/2.07 |
| 3,338,087 | 8/1967 | Moberg et al. | 73/421.5 X |
| 3,447,360 | 6/1969 | Laseter | 73/23.1 |
| 3,516,401 | 6/1970 | Dell'aira | 128/2.08 |
| 3,518,982 | 7/1970 | Timmins et al. | 128/2 |
| 3,527,205 | 9/1970 | Jones | 128/2.08 |
| 3,527,206 | 9/1970 | Jones | 128/2.08 |
| 3,531,257 | 9/1970 | Harvey et al. | 128/2.08 X |

Primary Examiner—Richard A. Gaudet
Assistant Examiner—Kyle L. Howell
Attorney—Dawson, Tilton, Fallon & Lungmus

[57] ABSTRACT

In a system for measuring the various desired parameters of a person's respiratory system, the person breathes into a closed volume of gas having a known concentration of helium until the concentration of helium in the enclosure and his lungs reaches an equilibrium. A helium analyzer is included in the system; and when the subject's breathing reaches the end of a resting expiration, a valve is turned to switch his breathing out of the closed system. A solenoid is also energized to maintain the volume of gas in the analyzer at a constant value; and computation circuitry receives the analyzer signal which is representative of the new helium concentration in the closed system to compute the various desired respiratory parameters of the subject's respiratory system including Functional Residual Capacity, Total Lung Capacity, or Residual Volume as called for by the operator. Further, the circuitry will compute the percentage of any of these parameters relative to a norm value for that parameter; and all computation results are preferably displayed on a digital voltmeter for facility of reading and recording.

8 Claims, 4 Drawing Figures

Inventors:
William C. Jones and
J. Mailen Kootsey
By Dawson, Tilton, Fallon & Lungmus
Attys.

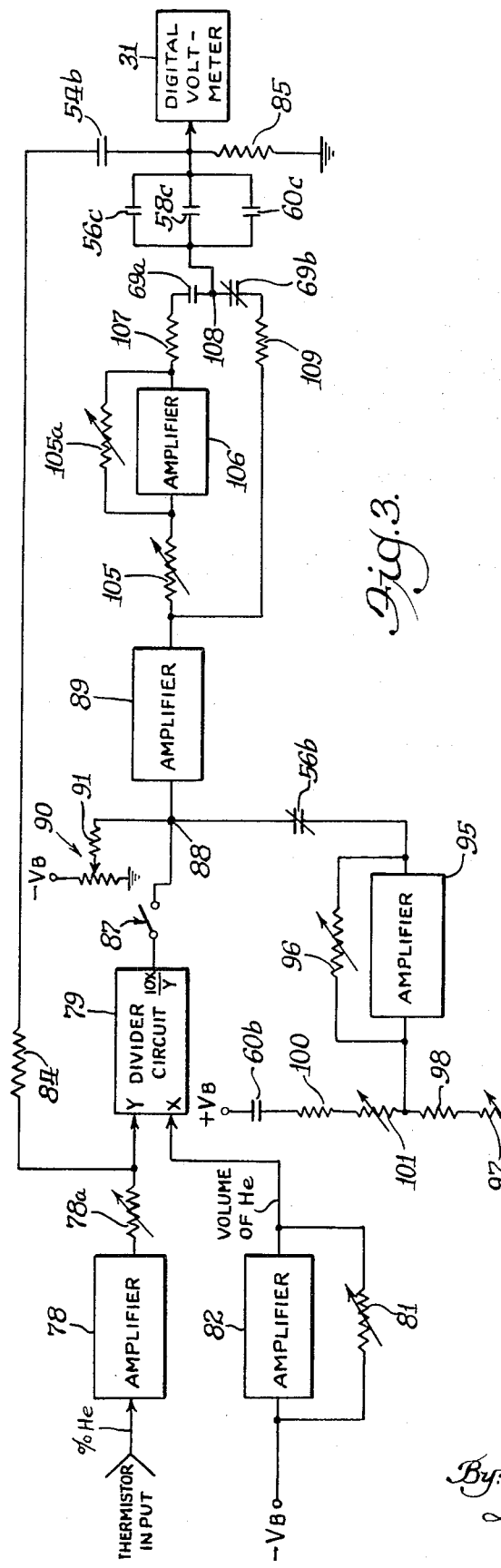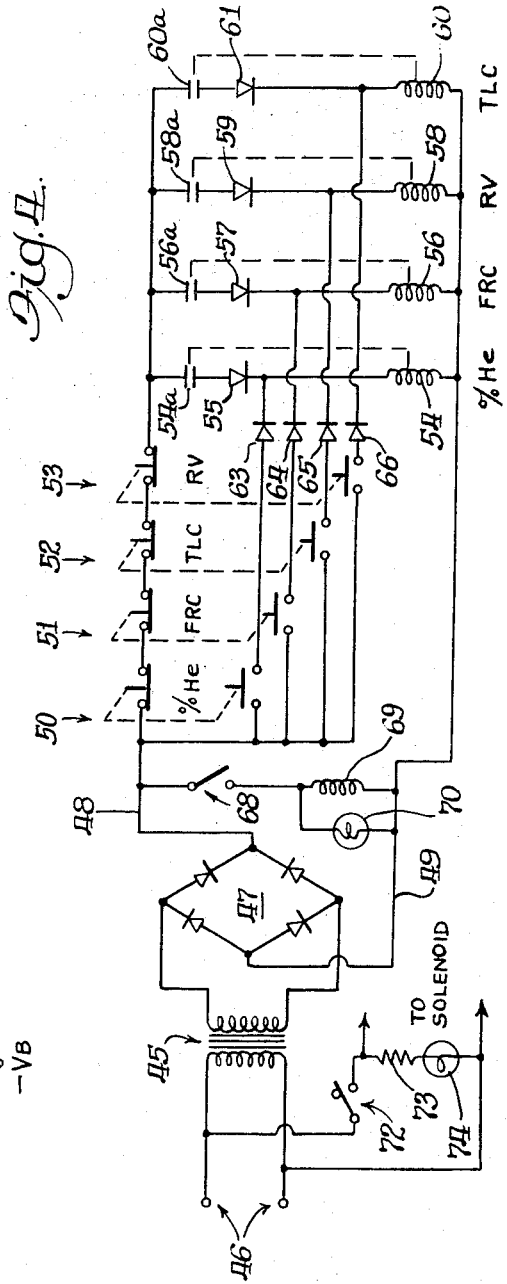

RESPIRATION TESTING SYSTEM

BACKGROUND AND SUMMARY

The present invention relates to a system for measuring various desired parameters of a person's respiratory system; and more particularly, it includes electronic circuitry for automatically computing the desired respiratory parameters and displaying them on a digital voltmeter from a signal generated by a helium gas analyzer.

In a copending, co-owned application of William C. Jones for RESPIRATION TESTING APPARATUS, Ser. No. 708,029, filed Apr. 2, 1968 now U.S. Pat. No. 3,527,205, there is described apparatus for measuring lung volume and capacity. That apparatus includes a spirometer, a rigid sealed container which contains an inflatable bag, and a mouthpiece. A two-position valve may be set alternatively to connect the inflatable bag to the spirometer while the mouthpiece is connected to the container, or to connect the mouthpiece directly to the spirometer while the bag and container are isolated. With the valve in the first position, a record is made of the subject's breathing cycle. After the record is made the valve is switched to a second position wherein the interior of the flexible bag is connected to the input of the spirometer; and the mouthpiece communicates with the interior of the container.

As the subject breathes into the volume contained in the dead space and the container, the bag expands and contracts and permits continued recording of the subject's breathing cycle while isolating the volume into which he breathes. After a state of equilibrium is reached in which the predetermined amount of helium is equally distributed throughout the contained volume and the subject's lungs, the mouthpiece conduits are switched back to the spirometer input at the end of a resting expiration of the subject. A gas analyzer then measures the concentration of helium in the contained volume; and from this, the operator may calculate the desired parameters which include the Functional Residual Capacity, Total lung Capacity, and Residual Volume from the analyzer reading. That application suggests that a conventional meter with a needle pointer movement and a calibrated scale be used to read Functional Residual Capacity directly. Total Lung Capacity and Residual Volume may then be computed from the reading for Functional Residual Capacity and the recording of the subject's breathing cycles.

The present invention includes an improved breathing circuit and a solenoid which is actuated by the operator after equilibrium has been reached and at the instant in which the subject's breathing cycle reaches the end of a resting expiration so that additional gas may not flow to or from the analyzer. Electronic circuitry is also included for automatically computing the values of Functional Residual Capacity, Total Lung Capacity, and Residual Volume, as well as the concentration of helium if it is desired. Each of these measurements are displayed on a digital voltmeter which greatly facilitates the recording of the measurements and minimizes the chances of operator error. Further, the circuitry includes means for computing the percentage of any one of the respiratory parameters relative to a predicted (or norm) value for a subject of the same sex, age, weight, etc. Thus, the instant invention greatly reduces the time required for measuring the desired respiratory parameters, reduces the chance of error in computing the Total Lung Capacity and Reserve Volume, and extends the utility of the testing of systems by permitting automatic comparison with predicted or norm values of any selected parameter. The values may also be converted to digital signals for recording on magnetic tape or punched computer cards to maintain a permanent record which is compatible with analysis on a digital computer, or transmitted over data lines for analysis.

Other features and advantages of the instant invention will be apparent to persons skilled in the art from the following detailed description of the preferred embodiment accompanied by the attached drawing.

THE DRAWING

FIG. 3 is a schematic diagram, partially in block form, of the respiratory computation circuitry; and FIG. 4 is a circuit schematic diagram of the operator switches which control the computation of the respiratory parameters.

DETAILED DESCRIPTION

Figure 1:
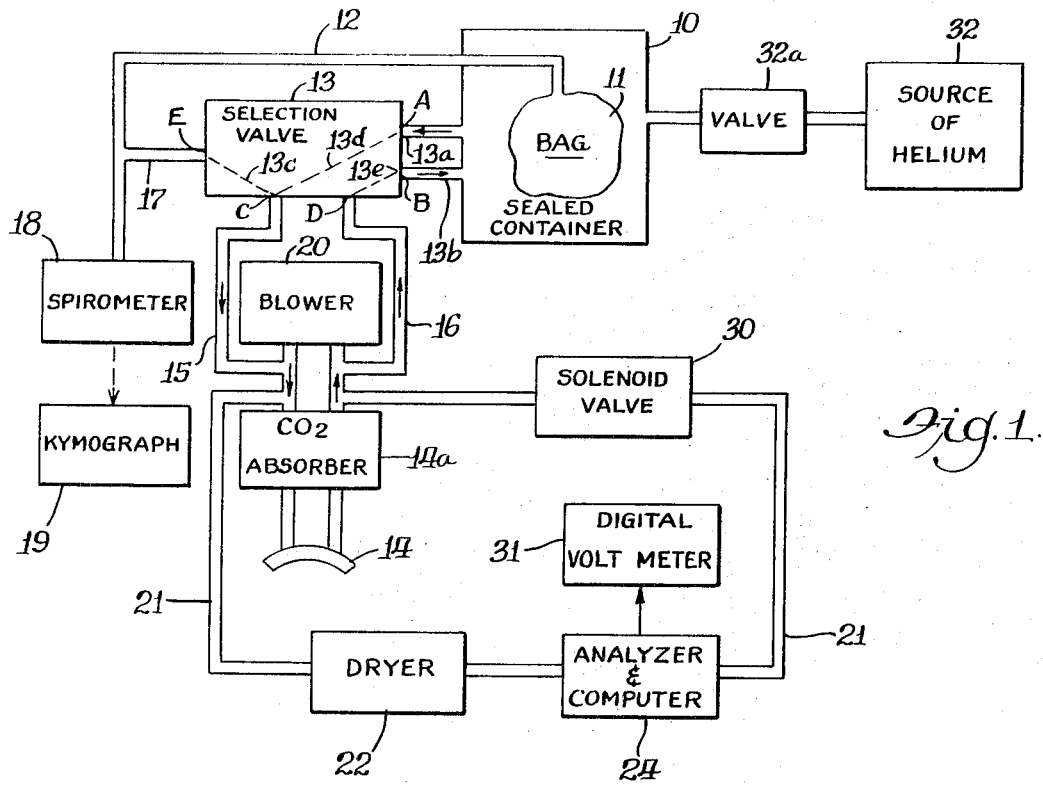
FIG. 1 is a schematic block diagram of a respiratory testing system incorporating the present invention.

Turning now to FIG. 1, a sealed container is diagramatically illustrated by the block denoted 10; and it encloses a flexible bag 11. The interior of the bag 11 communicates directly by means of a conduit 12 with a spirometer 18. The interior of the container 11 communicates with ports A and B of a two-position selection valve 13 via conduits 13a and 13b respectively. Two other ports (C and D) of the selection valve 13 are received from a mouthpiece 14 through conduits 15 and 16 respectively and a $CO_2$ absorber 14a. The conduit 15 returns the breath of a subject from the port C of valve 13, and the conduit 16 transmits breath to the port D from the mouthpiece when the valve 13 is turned to its second position.

Figure 2:
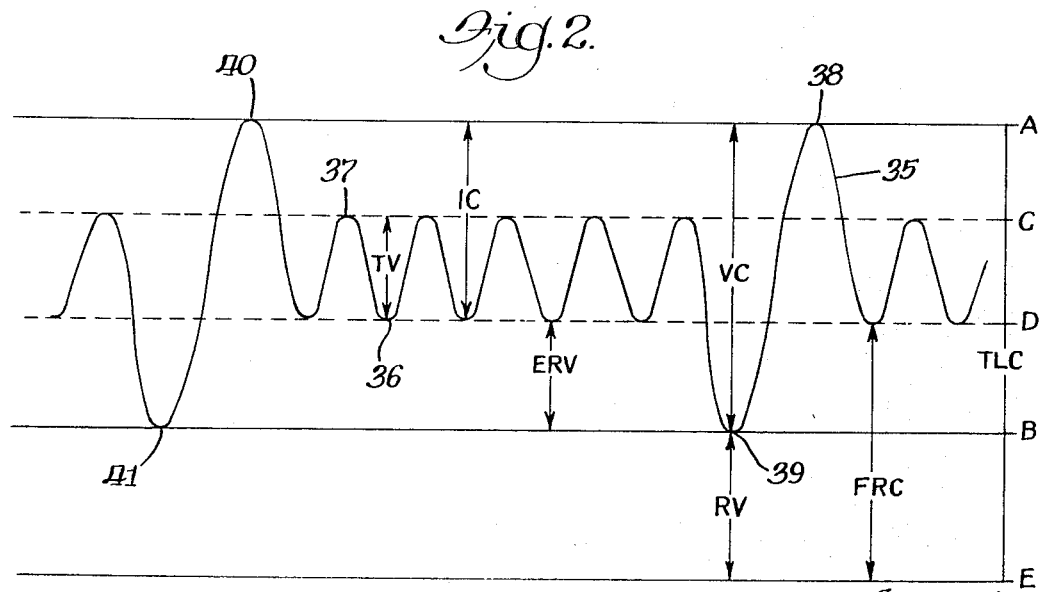
FIG. 2 is an idealized line diagram of a subject's breathing cycle.

The output port E of the selection valve 13 is connected by means of a conduit 17 to the spirometer 18 which measures the volume of air entering and leaving the lungs. The measurement of the spirometer 18 is recorded on a kymograph schematically designated at 19. The kymograph 19 is a conventional device which makes a permanent recording of the volume measured by the spirometer 18 by tracing the measurement on a continuously moving sheet of paper by means of a pen recorder. A typical kymogram is illustrated in FIG. 2, and will be discussed subsequently. A blower 20 is connected between conduits 15 and 16 adjacent the ports C and D of selection valve 13.

Conduit 15 also communicates through a conduit 21 and a dryer 22 with an analyzer and computer shown at 24. The output of the analyzer is fed through a continuation of conduit 21 and a solenoid valve 30 to conduit 16. The analyzer generates an electrical signal representative of the helium concentration of the gas being analyzed; and the computer calculates the desired pulmonary parameters which are then displayed on a digital voltmeter 31. The blower 20, when it is energized, circulates the gas contained in conduits 15, 16 and 21 and the analyzer as long as solenoid valve 30 is open. A predetermined amount of helium gas from a source 32 may be introduced into the sealed container 10 via a valve 32a for reasons presently to be explained.

As mentioned, the selection valve 13 has two different positions which may be manually selected. When the selection valve 13 is in its first position, the ports C and E are directly connected (as illustrated by the dashed line 13c) to couple the mouthpiece 14 directly to the input of the spirometer 17 via conduits 15 and 16 and blower 20. In this first position, input port D is connected to a dead end. In the second position of valve 13, the interior of the container 10 communicates with the mouthpiece 14 via the conduits 13a and 13b (illustrated by chain lines 13d and 13e), and conduits 15 and 16. Thus, with the selection valve 13 in its first position a pulmonary record is made of the subject. When the selection valve 13 is switched to its second position, the subject's respiratory system (i.e. lungs) becomes part of a closed system which includes the sealed interior of the container 10 (less the interior of the bag 11) the conduit 21, conduits 15 and 16, conduits 13a and 13b, and all intermediate enclosed volumes.

Prior to the subject's being switched into the contained volume, a predetermined and selected amount of helium is introduced into that volume from the source of the helium 32 to establish a predetermined and known concentration of helium within the contained volume (preferably 13 percent). The contained volume is sometimes referred to as the dead space; and it includes the entire enclosed volume defined by the container 10 and its associated conduits when the selection valve is in its second position, the conduits 15 and 16, conduit 21, blower 20, dryer 22, and analyzer 24. After a record has been made of the subject's breathing cycle, including maximum expiration and inspiration, the selection valve 13 is turned at a preselected time in the subject's breathing cycle to its second position; and a computation is made of the desired pulmonary parameters based upon the equilibrium concentration of helium in the contained volume which now includes the subject's lungs.

Referring now to FIG. 2, there is shown an idealized record of a subject's breathing cycle — i.e. a kymogram. The continuous, generally sinusoidal waveform designated 35 is the breathing record; and the paper on which it is recorded moves from left to right as viewed in the drawing so that time increases from right to left. The portion of the line 35 between the dashed horizontal lines C and D represents the breathing volume when the subject breaths normally. The difference between peaks and valleys in this normal breathing cycle is referred to as the Tidal Volume; and it may be calculated by simply subtracting a valley value as at 36 from a successive peak value as at 37. The arrow labeled TV is a pictorial representation of the Tidal Volume. In FIG. 2, the subject took a maximal inspiration and expiration represented respectively by the peak 38 and the valley 39, breathed normally for awhile, and then took another maximal inspiration followed by a maximal expiration indicated by the peak and valley 40 and 41.

Referring now to the right hand margin of FIG. 2, the letters A-E represent horizontal lines indicative of the various respiratory parameters of interest. The distance from the line A which joins the maximal peaks 38 and 40 to the line B which joins the lowest valleys 39 and 41 defines the Vital Capacity (see the arrow VC) which is the maximum amount of gas that can be expelled from the lungs following a maximal inspiration. The volume of gas remaining in the lungs at the end of a maximal expiration is referred to as the Residual Volume (see the arrow designated RV); and the sum of the Residual Volume and the Vital Capacity is the Total Lung Capacity (see the arrow TLC extending between the lines A and E). The Tidal Volume (TV), mentioned above, may be measured as the distance between the dashed lines C and D. The Maximum Volume of gas that can be inspired from the resting expiratory level i.e. the valley of a normal breathing cycle is referred to as the Inspiratory Capacity (IC); and it may be measured as the distance between the horizontal lines A and D (see the arrow IC in FIG. 2). The maximum volume of gas that can be expired from the resting expiratory level is referred to as the Expiratory Reserve Volume (see the arrow ERV); and it is measured as the distance between the horizontal lines D and B. From observation it may be seen that the Vital Capacity is equal to the sum of the Inspiratory Capacity and the Expiratory Reserve Volume.

The volume of gas remaining in the lung at the end of a normal rebreathing exhalation is referred to as the Functional Residual Capacity (see the arrow FRC); and it is equal to the sum of the Expiratory Reserve Volume and the Residual Volume. In FIG. 2 the Functional Residual Capacity is measured by the distance between the dashed line D and the solid base line E.

The position of the base line E cannot be measured by the spirometer or produced on the kymograph. Thus, none of the pulmonary parameters of Residual Volume, Functional Residual Capacity or Total Lung Capacity may be obtained from the record directly because each depends upon the position of the base line E. In the invention disclosed in the above-identified co-pending application, a respiratory testing apparatus was described which provides a direct read-out of Functional Residual Capacity.

In that system, however, there is included a conventional meter with a needle pointer indicated Functional Residual Capacity only, thereby rendering recording information dependent upon accurate reading of the meter and further requiring computation of Residual Volume and Total Lung Capacity after the Expiratory Reserve Volume of Inspiratory Capacity are measured directly from the graph. The circuitry comprising the analyzer computer 29 will be described in detail.

Turning then to FIG. 4, the primary winding of a transformer generally designated at 45 is connected to terminals 46 which are connected to a conventional source of 60 Hertz voltage. The secondary winding of the transformer 45 energizes a full-wave rectifier bridge designated 47, the output of which energizes dc power lines 48 and 49. Four push switches are employed for effecting the computation of the percent of helium, the Functional Residual Capacity, the Total Lung Capacity, and the Residual Volume; and these switches generally are designated respectively by reference numerals 50 to 53. Each of the switches 50-53 has a set of normally closed contacts and a set of open contacts; and these switches are of the momentary-contact type wherein the normally closed contacts break before the normally open contacts make. The normally closed contacts of all these switches 50-53 are in series and interposed in the power line 48. Also connected to the power line 48, but separated from the bridge 47 by the switches 50-53 are four parallel circuit branches, the first including a set of normally open relay contacts 54a, a diode 55, and a relay 54 which actuates the contacts 54a when energized. This series circuit is connected between power lines 48 and 49. A similar circuit including a relay 56, an associated set of normally open contacts 56a and a diode 57 is connected in series between the power lines 48 and 49. A third parallel branch comprises a relay 58 which actuates a set of normally open contacts designated 58a and connected in a series with a diode 59 and the relay 58 between the lines 48 and 49. Finally, a similar parallel branch includes a relay 60, a set of normally open contacts 60a and a diode 61. Each of the diodes 55, 57, 59 and 61 perform the function of isolating its particular circuit branch from the others as will be clear presently.

The normally open contacts of switch 50 are connected between the output of the bridge 47 and the cathode of the diode 55 by means of a diode 63. The normally open contacts of switch 51 are similarly connected between the output of the bridge 47 and the cathode 57 by means of a diode 64. Normally open contacts of the switch 52 are similarly connected between the output of the bridge circuit 47 and the cathode 59 by means of a diode 65; and the normally open contacts of switch 53 are similarly connected between the output of the bridge 47 and the cathode of the diode 61 by means of a diode 66. A switch 68 (shown in an open position) is connected in series with the coil of a relay designated 69; and a filament of an indicator lamp 70 is connected in parallel with the coil of the relay 69.

A switch 72 is connected in series with a resistor 73 and the filament of an indicator lamp 74 across the input terminals 46 which are connected to the ac source; and when the switch 72 is closed, the solenoid valve 30 is actuated to prevent further flow of gas through the conduit 27, thus insuring that the computations of various pulmonary parameters are all based on the same concentration of helium in the analyzer.

The type of analyzer preferably used in the present system is the kind which operates by measuring the thermal conductivity of the gas to determine the percent of helium in the contained volume. It thus generates a signal which is directly related to the percent of helium in the analyzer. This output signal is designated as the thermistor input in FIG. 3; and it is fed to the input of an amplifier diagramatically shown as the block 78. The output signal of amplifier is coupled through a variable resistor 78a to an input Y of a divider circuit 79. The amplifier 78 as well as the other amplifiers used in the system may be of conventional design, but they preferably are differential amplifiers which are commercially available in integrated circuit packages.

The negative terminal of a dc power source ($V_B$) is connected to a second amplifier 82, the output of which feeds the input X of the divider circuit 79. A variable resistor 81 is connected between the input and output terminals of the amplifier 78 to vary the gain thereof and thereby set its output voltage (which is representative of the amount of helium introduced into the enclosed volume before switching the valve 13 to its second position). The output of the amplifier 78 is also coupled through a resistor 84 and a set of normally open contacts 54b to the input of the digital voltmeter 31 which has already been mentioned. The input voltage to the digital voltmeter 31 is developed across a resistor 85.

The output of the divider circuit 79 (which actually generates a signal proportional to 10X/Y) is fed through a switch generally designated 87 to a summing junction 88 which provides the input to an amplifier 89. A potentiometer generally designated 90 is connected between the negative terminal of the power supply $-V_B$ and ground; and the movable contact of the potentiometer 90 is connected through a resistor 91 to the summing junction 88. The potentiometer 90 is used to generate a signal representative of the dead space in the system, as will be more fully described below.

A third signal which may be selectively coupled to the summing junction 88 is received from an amplifier 95 by means of a pair of normally open contacts 56b. A variable resistor 96 is connected between the input and output terminals of the amplifier 95 to set a value for either the Inspiratory Capacity or the Expiratory Reserve Volume; and the variable resistor 96 is preferably a calibrated potentiometer having 10 turns so as to achieve a three-place accuracy. The contacts 56b are actuated when the coil of relay 56 (FIG. 4) is energized.

A set of normally open contacts 58b are connected in a series with a variable resistor 97 and a fixed resistance 98 between the negative terminal of the power supply $V_B$ and the input of amplifier 95. The contacts 58b are energized by the relay 58. A set of normally open contacts 60b are connected in series with a fixed resistor 100 and a variable resistor 101 between the positive terminal of the power supply $V_B$ and the input terminal of the amplifier 95.

The output of the amplifier 89 is fed through a variable resistor 105, an amplifier 106, a fixed resistor 107, and a set of normally open contacts 69a to a junction 108. A variable resistor 105a is connected between the input and output terminals of amplifier 106. The output of the amplifier 89 is also fed through a resistor 109 and a set of normally closed relay contacts 69b to the junction 108. The contacts 69a and 69b are actuated when the relay coil 69 (FIG. 4) is energized. Thus, the junction 108 is connected either with the output of the amplifier 89 directly or with the output of the amplifier 106. Obviously, arrangements other than the sets of normally open and normally closed contacts illustrated may be used to accomplish this function.

The junction 108 is then fed to three sets of normally open relay contacts arranged in parallel and designated respectively 56c, 58c, and 60c which are actuated respectively when the coils of relays 56, 68 and 60 are energized. The other common terminal of the relay contacts 56c, 58c, and 60c is connected directly to the input of the digital voltmeter 31.

OPERATION

When the system is put into operation, the total dead space is determined by introducing a predetermined volume of helium into the sealed container 10 from source 32 via valve 32a. At this time the bag 11 is fully deflated, and the selection valve 13 is in its first position — i.e. the port C communicates with port E. It is desirable that the volume of the dead space be only slightly larger than a normal person's Tidal Volume — that is, of the order of 1.7 liters. Once the dead space is determined, this value is fed into the computer by turning the potentiometer 90 to generate a signal representative of the sum of the volume of dead space plus the volume of helium introduced.

After the dead space is accurately determined, the amount and pressure of a volume of helium from the source 32 necessary to establish a reference concentration in the dead space (for example 13 percent) is determined as described in the co-pending application. For example, if the volume of the dead space is 1.7 liters and the initial reference helium concentration is chosen to be 13 percent, the volume of helium that must be introduced from the source 32 is 260 milliters at atmospheric pressure. Apparatus may be employed to adjust the volume of dead space, if desired.

During routine operation, the volume of helium introduced at each test remains constant so as to always have a 13 percent concentration. It has been found that the device for introducing the helium, as disclosed in the above-identified application is highly reliable so that the 13 percent figure may advantageously be used to calibrate the computation circuitry which is subject to thermal drift, etc. by adjusting the variable resistor 78a as a micro-tuner device.

Prior to this, air in the flexible, collapsible bag 11 has been evacuated (by manipulating the spirometer). The subject or patient inserts the mouthpiece 29 into his mouth and breathes through the conduits 15 and 16. The selection valve 13 is turned to its first position as indicated by the dashed line 13c. At this time, the conduits 15 and 16 (through blower 20) are in communication with the conduit 17 and the input of the spirometer 18 so that a breathing record is made on the kymograph 19. The predetermined amount of helium from the source 32 may then be introduced into the conduit 21. Conduits 13a and 13b are cut off. As the patient breathes, the kymograph records the breathing cycle as shown in FIG. 2. The subject is made to take a maximal inspirational and a maximal expiration which are recorded in this example by the peak and valley 38 and 39 respectively. The subject then breathes normally and at the end of a resting expiration or Tidal Volume (indicated by the valley 36 of FIG. 2), the selection valve 13 is switched to its second position wherein the interior of the container 11 is in direct communication with the mouthpiece 14 and the interior of the collapsible bag 11 is connected to the spirometer. The solenoid valve 30 is opened. Thus, when the selection valve 13 is in its second position, the spirometer is connected to the interior of the bag 21, and the patient breathes the air and helium contained in the sealed container 10, conduit 13a, 13b, 15, 16 and 21. The blower 20 establishes a gas flow so that the patient inspires the gas from the interior of the container 10 through the conduits 13a and 15, and expires into the container through the conduits 16 and 13b in the direction of the arrows.

As the subject inspires, the bag 11 expands to replace the volume of gas removed from the interior of the container 10; and as the patient expires, the bag 11 deflates. Thus, even through the patient is breathing in a defined and closed system, the inflatable bag 11 permits recording of the subject's breathing cycle while isolating the air he breathes from the spirometer 18 by permitting air to be drawn into the container 10 and expelled therefrom following exactly the subject's breathing. The subject's breathing cycle is continued to be recorded on the kymograph 19 even though the patient is not breathing directly into the spirometer. Oxygen consumed during this period may be replaced as explained in the above-identified co-pending application, if desired.

The patient breathes normally until the helium concentration within the container 10, its associated conduits, and the subject's lungs achieves an equilibrium.

After the equilibrium has been reached as determined by noticing that the drop in helium concentration has ceased, the operator depresses switch 72 (FIG. 4). Switch 72 may be a push button switch of the type which makes on the first depression and breaks on a successive depression. The actuation of switch 72 energizes the filament of lamp 74 to signal that the hold solenoid is energized, and it energizes the solenoid valve 30. Thus, the volume of air and the helium concentration on which the analyzer and computer 29 operates remains a constant for all of the computations.

After the various amplifiers and the divider circuit of the computing circuitry is initially adjusted, the volume of the dead space plus the initial volume of helium is entered into the computer circuitry by means of the potentiometer 90; and a value representative of the initial volume of helium is also entered into the computation circuitry by means of the variable resistor 81 which preferably is a 10-turn variable resistor to achieve a wider range of operation and greater accuracy. The operator then depresses the push button switch 50 to energize the coil of relay 54 which, in turn, actuates contacts 54a to hold the relay 54 energized when the momentary-contact push button switch 50 is released. At the same time, the contacts 54b of FIG. 2 make, and the output of amplifier 78 is fed directly to digital voltmeter 31 to display the concentration of helium. If the reading is not exactly 13.00 percent suitable adjustment of resistor 78a is made until the digital voltmeter does read that value. As mentioned, this feature greatly facilitates adjustment required by changes in the circuitry and transistors in the analyzer portion of the system with the result of a greater accuracy, reliability and repeatability of results.

Next, the operator depresses the push button 51 which first removes power from the coil of relay 54 and then energizes the coil of relay 56. Once energized, relay 56 closes contacts 56a to hold itself energized when the push button 51 is released. At the same time, the relay 56 opens the normally closed contacts 56b to isolate the output of the amplifier 95 from the remainder of the computation circuitry and closes contacts 56c which couples the output of the amplifier 89 through resistor 109 and normally closed contacts 69b to the input of the digital voltmeter 31. At this time, the switch 87 is closed so that the signal at the summing junction 88 has two terms, one representative of the division of the volume of helium introduced into the closed system divided by the concentration of helium and the other being the subtraction of a signal representative of the sum of the dead space and the initial volume of helium introduced. Thus, the output of amplifier 89 generates a signal solving the following equation:

$$FRC = \frac{V_{He}}{C_{He}} - V_{DS} - V_{He}$$

where

FRC is the Functional Residual Capacity of the subject;
$C_{He}$ is the equilibrium concentration of helium;
$V_{He}$ is the volume of helium introduced from the source of helium 32; and
$V_{DS}$ is the dead space of the apparatus.

The above equation defines the Functional Residual Capacity, and reference may be made to the above-identified co-pending application for further development of the equation.

The computation of Functional Residual Capacity may be read directly on the digital voltmeter 31 from which it may be easily recorded by hand. Alternatively, the input signal to the digital voltmeter 31 which is representative of Functional Residual Capacity may be converted to a digital signal and stored on magnetic tape or punched cards for further computation or record keeping. From the patient's breathing record as recorded by the kymograph, a reading is taken manually for Inspiratory Capacity (this is the distance between solid line A and the dashed line D in FIG. 1); and this value in liters is set on the variable resistor 96. When the push button switch 52 is next depressed, it will de-energize the coil of relay 56 and energize the coil of relay 58. Again, normally open contacts 58a will hold the relay 58 energized when the push button 52 is released.

The relay 58 also closes the contacts 58b to couple the negative terminal of the power supply $(-V_B)$ to the input of the amplifier 95 so that the amplifier 95 generates an output signal which is representative of Inspiratory Capacity. At this time, the contacts 56b have returned to their normal closed state; and the contacts 58c are closed. The signal present at the summing junction 88 is representative of the Functional Residual Capacity plus the Inspiratory Capacity of the subject which, from observation of FIG. 1, determines the Total Lung Capacity. Thus, depression of the switch 52 provides a signal at the digital voltmeter 31 which reads directly the Total Lung Capacity.

Next, the operator measures the Expiratory Reserve Volume from the subject's breathing record and enters the value into the computation circuitry by manipulating the variable resistor 96. When the operator then depresses the switch 53, the relay 58 is de-energized and the relay 60 is energized and held in place by means of the contacts 60a. At the same time, contacts 58b open and contacts 60b close so that the signal present at the summing junction 88 is representative of the difference between the Functional Residual Capacity and a signal representative of the Expiratory Reserve Volume. This, from observation of the record of FIG. 1, yields the Residual Volume (the difference between solid line B and the base line E). The output of the amplifier 89 is then coupled directly to the input of the digital voltmeter 31 through the then-closed contacts 60c.

If it is desired to compare any of the computed values for Functional Residual Capacity, Total Lung Capacity, or Residual Volume with a norm or predicted value, the predicted value (which may be obtained from published data) is entered into the computer circuitry by adjusting the variable resistor 105 which preferably is a 10-turn variable resistor.

The configuration of variable resistors 105 and 105a together with amplifier 106 enable the computation of percentages. The adjustable resistor 105a is predetermined and set as a sealing factor — i.e., once set, it remains constant. The voltage gain of the circuit may be expressed as:

$$v_o = R_{105a}/R_{105}$$

where $v_o$ is the output voltage;
$v_i$ is the input voltage;
$R_{105a}$ is the resistance value of resistor; and
$R_{105}$ is the resistance value of resistor 105.

As an example, if 1 volt represents 1,000 cc., $R_{105a}$ is set at 100,000 ohms (representative of 1,000 cc.), and the norm value is 200 cc., then $R_{105}$ is set to 20,000 ohms. Now, if the actual RFC (as represented by the output signal of amplifier 89) is 400 cc. (a $v_i$ signal of 0.4 volts), then $v_o = (0.4) \cdot (5) = 2.00$ or 200 percent since 400 cc. (the measured capacity) is 200 percent of the predicted or norm value.

The switch 68 is also closed to energize the coil of relay 69 so that the contacts 69b open and the contacts 69a close. The filament of lamp 70 is lighted to indicate that a computation of the percentage of a predicted value is being computed. As a further example, if it is desired to compute the percentage value of Total Lung Capacity, the predicted value is entered in the variable resistor 105, the switch 68 is closed, and the push button 52 is depressed. The output of the amplifier 89 is a signal representative of the actual Total Lung Capacity for the subject, the output signal of amplifier 106 is representative of the percentage of the measured Total Lung Capacity relative to a predicted or norm value. The signal is also coupled directly to the input of the digital voltmeter 31. The Functional Residual Capacity and Residual Volume may be similarly compared with predicted values.

The use of the computation circuitry may be extended beyond the direct readouts of FRC, TLC, RV, and their percentage of predicted normal values. For example, it is useful to compare the Inspiratory Capacity, Expiratory Reserve, and Vital Capacity Volumes to predicted values, as just described. It is also useful to obtain percentage values of tests such as a timed Vital Capacity test wherein the amount of volume the subject forcefully exhales at predetermined time intervals after commencement (for example 1, 2, and 3 seconds thereafter) are related to the patient's Total Lung Capacity.

Assuming that the results of a test indicate that an FRC value at the end of a time period of 1 second is 4.0 liters, push button 53 (RC) is depressed and resistor 101 is adjusted until the digital voltmeter reads 4.0. Next, the resistor 105 is adjusted to a value representative of the Vital Capacity value, so that when switch 68 is closed, the correct percentages are computed and displayed on the digital voltmeter 31.

As an alternative method of generating the signals representative of Inspiratory Capacity and Expiratory Reserve Volume, the wiper arms of the potentiometers 101 and 97 respectively may be connected mechanically to the pen or stylus of the recording spirometer, so that the values of Inspiratory Capacity and Expiratory Reserve Volume are set without the intervention of an operator. That is, in the automatic setting of Inspiratory Capacity, the wiper arm of potentiometer 101 would be set to zero at the end of a title volume so that when a maximal inspiration is taken, the stylus of the spirometer would move the wiper arm of variable resistor 101 to a position at which there would be generated a signal representative of Inspiratory Capacity, and the variable resistor would be held there. Similarly, the variable resistors 97 would be set to zero at the end of a title volume and connected to the spirometer stylus prior to a maximal expiration thereby generating a signal representative of Expiratory Reserve Volume.

Having thus described in detail the preferred embodiment of the inventive system, a person skilled in the art may be able to modify certain portions of the system illustrated and to substitute equivalent structure for that which has been disclosed while continuing to practice the inventive principles; and it is, therefore, intended that all such modifications and substitutions be covered as they are embraced within the spirit and scope of the invention.

We claim:

1. In combination, a respiratory testing apparatus including means for recording the breathing cycle of a subject, container means for confining the breath of the patient in a predetermined volume containing a known amount of helium, analyzer means for generating a signal representative of the concentration of helium in said known volume, first circuit means for generating a signal representative of said known amount of helium, divider circuit means receiving the output signals of said analyzer means and said first circuit means for generating a quotient signal representative of the quotient of said two received signals, second circuit means for generating a signal representative of the sum of the dead space in said container means and said initial volume of helium and for subtracting said last-named signal from said quotient signal to generate a signal representative of the Functional Residual Capacity of said subject.

2. The system of claim 1 further comprising display means for displaying a received electrical signal in digital form, and first switch means for selectively coupling said signal representative of Function Residual Capacity of said patient to said display means.

3. The system of claim 2 further comprising second switch means for selectively coupling said signal representative of the concentration of helium in said known volume to said display means to display the same exclusive of said signal representative of Functional Residual Capacity.

4. The system of claim 3 further comprising adjustable circuit means associated with said first circuit means for varying said generated signal thereof to a predetermined value on said display means representative of a known initial concentration of helium.

5. The system of claim 1 further comprising third circuit means for generating a signal representative of Inspiratory Capacity, and third switch means for selectively adding said last-named signal to said signal representative of Functional Residual Capacity thereby to generate a signal representative of Total Lung Capacity.

6. The system of claim 1 further comprising fourth circuit means for generating a signal representative of Expiratory Reserve Volume, and fourth switch means for selectively subtracting said signal representative of Expiratory Reserve Volume from said signal representative of Functional Residual Capacity to generate a signal representative of Residual Volume.

7. The system of claim 1 further comprising settable fifth circuit means adjustable to have an impedance value representative of a norm or predicted value of a pulmonary parameter, and fifth switch means for selectively feeding said signal representative of said Functional Residual Capacity to said fifth circuit means to generate a signal representative of the percentage of said measured Functional Residual Capacity signal is relative to said norm signal.

8. The system of claim 7 further comprising a digital voltmeter adapted to selectively display said computed signals representative of Function Residual Capacity and said percentage when said first and fifth switching means are actuated respectively.

* * * * *